United States Patent [19]
Purlia

[11] 3,863,380
[45] Feb. 4, 1975

[54] ILLUMINATED FISHING LURE WITH LINE ATTACHMENT

[76] Inventor: John M. Purlia, 8908 Shelbyville Rd., Apt. 6, Louisville, Ky. 40222

[22] Filed: June 24, 1974

[21] Appl. No.: 482,668

Related U.S. Application Data

[63] Continuation-in-part of Ser. No. 365,595, May 31, 1973.

[52] U.S. Cl............... 43/17.6, 43/42.35, 43/42.39, 43/42.49
[51] Int. Cl............................................ A01k 85/00
[58] Field of Search ..... 43/17.6, 17.5, 42.22, 42.39, 43/42.49, 42.35

[56] References Cited
UNITED STATES PATENTS

| | | | |
|---|---|---|---|
| 1,422,841 | 7/1922 | Dey | 43/17.6 |
| 2,665,511 | 1/1954 | Bradberry | 43/42.39 |
| 2,736,124 | 2/1956 | Wittmann, Jr. | 43/42.22 |
| 3,158,953 | 12/1964 | Filler | 43/42.22 |
| 3,576,987 | 5/1971 | Voight | 43/17.6 |
| 3,708,903 | 1/1973 | Bercz et al. | 43/17.6 |
| 3,762,092 | 10/1973 | Bercz et al. | 43/17.6 |

Primary Examiner—Warner H. Camp
Attorney, Agent, or Firm—John A. Robertson

[57] ABSTRACT

An illuminated fishing lure with line attaching means has a flexible outer cylindrical tube having end walls and an inner rigid frangible tube spaced from the outer tube and containing chemiluminescent material, with the space between the two tubes receiving a chemiluminescent material complemental to that in the inner tube, so that when the inner tube is ruptured, the two chemiluminescent materials intermix and react to generate light. The outer tube is continued beyond one end wall and cut away to provide a tab formed with an opening for receiving a fishing line. A sleeve is formed as an integral extention of the outer tube at the other end and projects beyond the end wall at that end to cooperate therewith in defining a socket. The projecting portion of this sleeve is threaded. A weight is received in the socket and a cap is screwed onto the threaded portion of the sleeve to hold the weight in assembled relation with respect to the outer tube. This cap has a top wall through which is secured an eyelet through which the fishing line is passed. A bumper is secured to the fishing line in spaced relation to the eyelet and another bumper secured to the fishing line in spaced relation to the tab.

6 Claims, 5 Drawing Figures

PATENTED FEB 4 1975 3,863,380

ILLUMINATED FISHING LURE WITH LINE ATTACHMENT

This application is a continuation-in-part of the copending application of John M. Purlia, Ser. No. 365,595, filed May 31, 1973, entitled "Fishing Lure with Chemically Generated Illumination."

The present invention relates to fishing lures which include as a characteristic and essential element a cartridge in which a light is chemiluminescently generated and is concerned primarily with means for attaching the cartridge to a fishing line.

BACKGROUND OF THE INVENTION

Many fishermen have now come to recognize the desirability of using an illuminated lure for the purpose of attracting fish. Moreover, the desirability of such illuminated lures which do not require electricity for the generation of light has long been recognized.

At the present time, the American Cyanamid Company is producing a chemical lighting device to store, initiate and display chemical light which is sold under the trademark Cyalume. This chemical lighting device is fully disclosed in U.S. Pat. No. 3,576,987. It includes as characteristic and essential elements a flexible outer cylindrical tube having end walls and an inner rigid frangible tube within and spaced from the outer tube. The space between the two tubes is filled with a chemiluminescent material and the inner tube receives a complementary chemiluminescent material, which, when the inner tube is ruptured, intermixes and reacts with the chemiluminescent material in the space between the two tubes to generate a chemical light.

This invention is founded on the basic concept of employing a cartridge comprising the above enumerated elements of said patent as a fishing lure. In the copending application above identified, this cartridge is replaceably positioned in a two-part body to which other fishing elements such as hooks, flies, flutter plates, and the like, may be attached. In accordance with the present invention, the lure is attached directly to a fishing line.

A chemiluminescent cartridge of the type aforesaid has an effective life of about 3 to 4 hours. Thus, for all practical purposes, when a fisherman is about to embark on a fishing operation, a fresh cartridge must be attached to the line. This means that an angler will ordinarily acquire a plurality of such cartridges which he maintains in a stored condition in his kit. This means that a plurality of such cartridges must be susceptible of being stored in a safe, compact condition. Thus, the use of laterally extending line attaching means is indicated as being highly undesirable.

A fishing lure is, from the very nature of the fishing operation, intended to sink into and become immersed in water. A chemiluminescent cartridge of the character above indicated does not have a specific gravity which is greater than that of water and, hence, will not of its own volition sink into the water. This means that a weight must be attached to the cartridge and due to the fact that a new cartridge will ordinarily be used on each fishing trip, it is desirable that the weight may be removable from one cartridge and assembled with another cartridge.

It is highly desirable, if not absolutely essential, that the lure assume a fixed position with respect to the fishing line to which it is attached. Thus, a simple and effective means for effecting this attachment is indicated as highly desirable.

OBJECTS OF THE INVENTION

With the foregoing conditions in mind, the present invention has in view the following objectives:

1. To provide a chemiluminescent fishing lure comprising a cartridge in which chemical light is generated by the intermixing and reacting of chemiluminescent materials in the cartridge, together with means for attaching the cartridge to a fishing line.

2. To provide a fishing lure of the type noted in which the cartridge is provided with means for removably assembling a weight therewith.

3. To provide, in a fishing lure of the character aforesaid, a cartridge comprising an outer fishing cylindrical tube having end walls, an inner rigid frangible tube within and spaced from the outer tube, a chemiluminescent material in the space between the two tubes and a complementary chemiluminescent material in the inner tube, together with line attaching means which are positioned longitudinally beyond the end walls of the outer tube.

4. To provide, in a fishing lure of the kind described, a cutaway extension of the outer tube which projects beyond the end wall at one end and which is formed with an aperture for receiving a fishing line.

5. To provide, in a fishing lure of the type noted, a sleeve which is formed as an integral extension of the outer tube adjacent to the other end wall and which has a portion projecting beyond that end wall to provide a socket in which a weight is removably positioned.

6. To provide, in a fishing lure of the character aforesaid, a cap which is screwed onto the projecting portion of the sleeve and which has a top wall on which an eyelet is mounted and through which the fishing line passes.

7. To provide, in a fishing lure of the kind described, a pair of bumpers which are attached to the fishing line at opposite ends of the cartridge beyond the tab at one end and the eyelet at the other to hold the lure in fixed position on the line or limit movement of the lure relative to the line.

Various other more detailed objects and advantages of this invention, such as arise in connection with carrying out the above ideas in a practical embodiment, will, in part, become apparent and, in part, be hereafter stated as the description of the invention proceeds.

SUMMARY OF THE INVENTION

The foregoing objects are achieved by providing a chemiluminescent material consisting essentially of a cartridge for generating chemical light, means for removably assembling a weight with the cartridge and line attaching means. The cartridge comprises an outer cylindrical flexible tube having end walls, and an inner rigid frangible tube within said outer tube and spaced therefrom. The space between the two tubes receives a chemiluminescent material, while the inner tube received a chemiluminescent material complemental to that in the space between the tubes so that when the inner tube is ruptured as by flexing and bending the outer tube, the chemiluminescent materials interact to generate a chemical light. At one end the outer tube is continued beyond the end wall and cutaway or gradually diminished from a point on one side to a tab which projects longitudinally from the end wall on the side diametrically opposite to the point aforesaid. This tab is reinforced by a triangularly shaped rib which is secured to the outer face of this end wall and extended portion of the tube, preferably being integral with these elements. The tab is formed with an aperture for receiving a fishing line.

A sleeve is formed as an integral extension of the outer tube adjacent to the other end wall and has a portion projecting beyond that end wall, whereby it cooperates therewith to define a socket. A weight is removably positioned in this socket. The projecting portion of this sleeve is externally threaded and a cap is screwed onto this threaded portion to retain the weight in assembled relation with respect to the cartridge. This cap has a top wall on which an eyelet is mounted centrally thereof. The fishing line passes through this eyelet.

It is evident that the fishing line in passing through the eyelet and the aperture in the tab is deformed from a straight line position to provide so called "kinks" in the line which under some conditions may be sufficient to maintain the lure in a fixed position on the line. However, to supplement the function of these kinks, and to insure that the cartridge does not have any appreciable movement relative to the line, bumpers may be secured to the line beyond opposite ends of the lure.

For a full and more complete understanding of the invention, reference may be had to the following description and the accompanying drawing wherein.

DESCRIPTION OF THE PREFERRED EMBODIMENT

Figure 1:
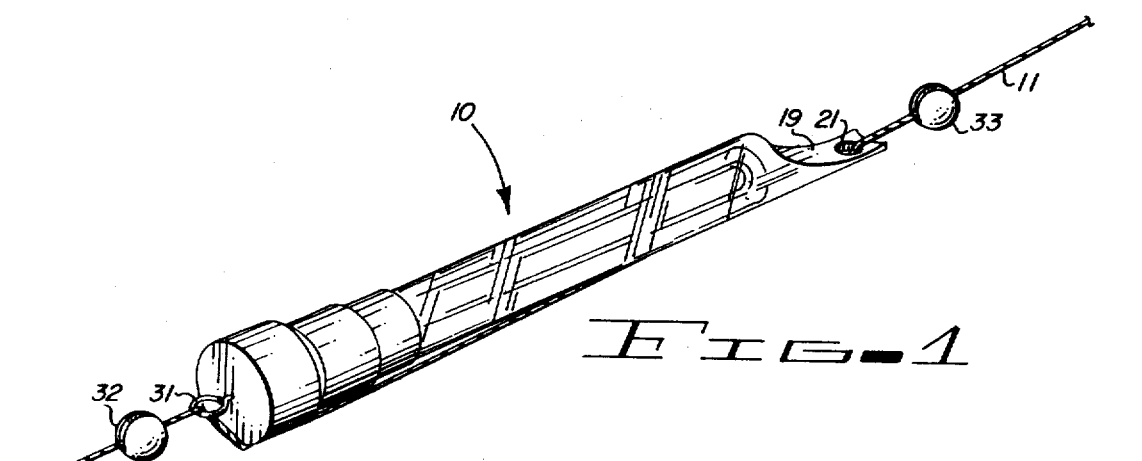
FIG. 1 is a perspective illustrating the chemiluminescent fishing lure of this invention as applied to a fishing line.

Referring now to the drawing, wherein like reference characters denote corresponding elements throughout the several views, and first more particularly to FIG. 1, the fishing lure of this invention is shown as comprising a cartridge identified generally at 10 and which is secured to a fishing line 11.

Figure 2:
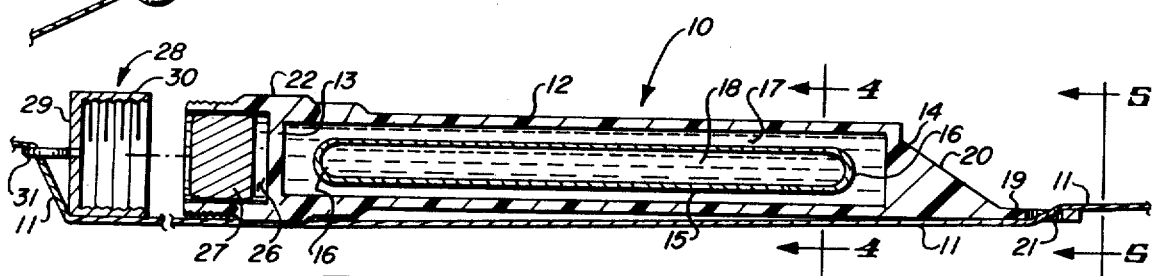
FIG. 2 is a longitudinal section through the lure shown in FIG. 1.

Referring now more particularly to FIG. 2, the cartridge 10 comprises a flexible outer cylindrical tube 12 which may be of any material which provides the required properties of flexibility and which is inert with respect to a chemiluminescent material to be later described. There are many plastics now available and commonly known to the public which will meet these requirements. Tube 12 is closed at one end by an end wall 13 and at the other end by an end wall 14.

Positioned within the outer tube 12 and spaced from the inner surface thereof is a rigid frangible inner tube 15. Tube 15 may be of glass or other material which is inert with respect to chemiluminescent materials to be later described and which is susceptible of being fractured or ruptured when bending stresses are applied thereto.

At this point it is well to note that in U.S. Pat. No. 3,576,987 the inner tube is shown either as having its ends received in depressions in the end walls or in engagement with the end walls. However, this relation is not essential to proper functioning of the cartridge which is shown with end walls 16 which are spaced from end walls 13 and 14.

The space between the outer tube 12 and the inner tube 15 is designated 17 and is filled with a chemiluminescent material. Another chemiluminescent material is received within tube 15 and is designated 18. The two chemiluminescent materials are complementary to one another so that when they intermix, they react and generate a chemical light.

Figure 3:
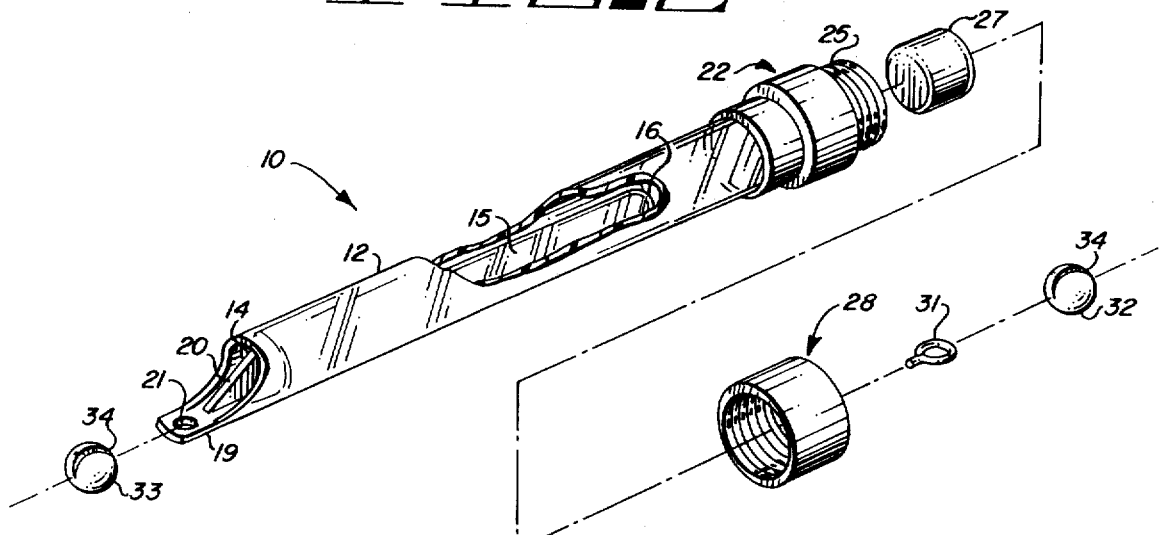
FIG. 3 is a perspective illustrating the elements of the instant lure in exploded relation.
Figure 4:
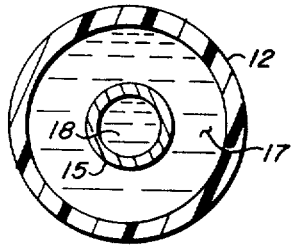
FIG. 4 is a transverse section through the lure, taken on the plane of the line 4—4 of FIG. 2.
Figure 5:
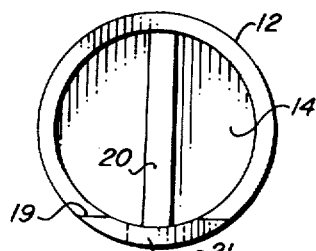
FIG. 5 is a view in end elevation taken on the plane of the line 5—5 of FIG. 2.

Referring now more particularly to the lower left hand portion of FIG. 3, the material of outer tube 12 is shown as continued beyond end wall 14 in what is believed to be best described as a cutaway structure providing a tab 19. This tab 19 is reinforced by a triangularly shaped rib 20, one edge of which is secured to the outer face of end wall 14 as by being fused or otherwise secured thereto, and another side edge similarly secured to tab 19. Thus, the cutaway structure can be described by noting that that portion of the tube which extends beyond end wall 14 gradually reduces in dimension from the top of rib 20 to tab 19. The latter is formed with an aperture 21 through which fish line 11 passes.

Referring now to the left hand side of FIG. 2, a sleeve 22 is formed as an integral extension of outer tube 12 and has a bore of a diameter the same as the diameter of the outer surface of tube 12. The end portion of sleeve projects beyond end wall 13 and is externally threaded as indicated at 25 in FIG. 3 and cooperates with end wall 13 in defining a socket 26. A weight 27 is removably positioned in socket 26. Weight 27 may be of any material having the required specific gravity, with lead being indicated as the preferred material.

A cap is referred to generally at 28 and comprises a top wall 29 and an internally threaded skirt 30. Skirt 30 is screwed onto the threaded portion 25 of sleeve 22 to maintain weight 27 assembled in socket 26. An eyelet 31 is secured to the center of the top wall 29 in any preferred manner and fish line 11 passes through this eyelet.

It is evident that when fish line 11 passes through aperture 21 and eyelet 31, it is deformed from a straight line and so-called kinks are created therein. These kinks will to a degree inhibit movement of the cartridge 10 relative to line 11. However, to supplement their movement-restricting function, a pair of bumpers 32 and 33 may be secured to line 11 in a well-known manner. While there are many elements which will perform the functions of these bumpers, it is noted that each of these bumpers is a small lead pellet having a kerf 34 opening onto the exterior of the pellet. When the line 11 is received in the kerf of one of these bumpers, a pair of pliers or other tool may be applied to the pellet to close the kerf and securely affix the bumper to the fish line.

OPERATION

While the mode of operation and manner of using the subject fishing lure is believed to be obvious from the illustration of the drawing and description of parts set forth above, it is briefly described as follows:

A weight 27 is first positioned in a socket 26 and cap 28 screwed onto end portion of sleeve 22 to insure the assembled relation. Fish line 11 is then passed through eyelet 31 and aperture 21. If desired, bumpers 32 and 33 are then secured to the line. The fisherman then applies bending pressure to outer tube 12 of cartridge 10, and as this pressure is continued, inner tube 15 is ruptured, whereupon the chemiluminescent materials in space 17 and tube 15 intermix and react to generate light. With a hook secured to the line 11, preferably beyond bumper 32, the fisherman is now in business. As the cartridge 10 is introduced into water, the weight 27 will cause it to sink and assume a substantially vertical position. As mentioned above, the cartridge 10 will have an effective life of about 3 to 4 hours. Thus, after a cartridge is expended, cap 28 may be unscrewed from end portion of sleeve 22 to permit removal of weight 27 so that it can be assembled with a fresh cartridge.

While a preferred specific embodiment is herein disclosed, it is to be clearly understood that the invention is not to be limited to the exact construction, materials and devices illustrated and described because various modifications of these details may be provided in putting the invention into practice.

What is claimed is:

1. In an illuminated fishing lure,
   a. a cartridge comprising an outer flexible tube having end walls, an inner rigid frangible tube within and spaced from said outer tube, a chemiluminescent material in the space between said tubes and another chemiluminescent material in said inner tube, said chemiluminescent materials being complemental so that when they intermix and react, they generate a chemical light;
   b. a tab formed as a longitudinal continuation of said outer tube and extending beyond one of said end walls, said tab being formed with an aperture for receiving a fishing line;
   c. a sleeve integral with said outer tube adjacent to the other of said end walls and having an end portion projecting longitudinally beyong said last mentioned end wall and defining a socket;
   d. a weight removably received in said socket;
   e. a cap secured to the projecting portion of said sleeve and having a top wall, and
   f. an eyelet mounted on said top wall and receiving said fishing line.

2. The fishing lure of claim 1 in which said tab is reinforced by a rib having one side edge secured to the outer face of the end wall adjacent to said tab and another edge to the tab.

3. The fishing lure of claim 2 in which the outer tube is continued beyond the end wall at which the tab is located and gradually diminishes from the zone adjacent one end of the rib to the tab adjacent the aperture therein.

4. The fishing lure of claim 1 in which the eyelet is mounted centrally of the top wall.

5. The fishing lure of claim 1 in which the end portion of the sleeve is externally threaded and the cap includes a skirt which is internally threaded and which is screwed onto said end portion of the sleeve.

6. The fishing lure of claim 1, together with a pair of bumpers which are secured in fixed positions on the fishing line beyond opposite ends of said cartridge.

* * * * *